United States Patent
Wu et al.

(10) Patent No.: US 11,961,249 B2
(45) Date of Patent: Apr. 16, 2024

(54) GENERATING STEREO-BASED DENSE DEPTH IMAGES

(71) Applicant: Black Sesame Technologies Inc., San Jose, CA (US)

(72) Inventors: Tiecheng Wu, Singapore (SG); Bo Li, Singapore (SG)

(73) Assignee: Black Sesame Technologies Inc., San Jose, CA (US)

(*) Notice: Subject to any disclaimer, the term of this patent is extended or adjusted under 35 U.S.C. 154(b) by 376 days.

(21) Appl. No.: 17/376,027

(22) Filed: Jul. 14, 2021

(65) Prior Publication Data
US 2023/0035671 A1 Feb. 2, 2023

(51) Int. Cl.
*G06T 7/55* (2017.01)
*G06N 20/00* (2019.01)
*G06T 5/70* (2024.01)

(52) U.S. Cl.
CPC .............. *G06T 7/55* (2017.01); *G06N 20/00* (2019.01); *G06T 5/70* (2024.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 9,916,519 B2* | 3/2018 | Rodriguez | ............ | H04M 1/724 |
| 10,375,378 B2* | 8/2019 | Wu | ............ | H04N 13/271 |
| 10,437,878 B2* | 10/2019 | Ranzinger | ............ | G06V 10/764 |
| 2012/0105654 A1* | 5/2012 | Kwatra | ............ | G06T 3/00 348/208.4 |
| 2018/0181593 A1* | 6/2018 | Ranzinger | ............ | G06V 10/82 |
| 2020/0007849 A1* | 1/2020 | Chang | ............ | H04N 13/246 |
| 2023/0035671 A1* | 2/2023 | Wu | ............ | G06N 3/0455 |

OTHER PUBLICATIONS

H. Hirschmüller, "Stereo Processing by Semi-Global Matching and Mutual Information," in IEEE Transactions on Pattern Analysis and Machine Intelligence, vol. 30, No. 2, pp. 328-341, Feb. 2008.
R. Szeliski, "Computer Vision: Algorithms and Applications," Springer-Verlag New York, Inc., New York, NY, USA, 1st edition, 2010, 33 pages.

* cited by examiner

Primary Examiner — Tahmina N Ansari
(74) Attorney, Agent, or Firm — Fish & Richardson P.C.

(57) ABSTRACT

Methods, systems, and apparatus, including computer programs encoded on computer storage media, for generating a depth image, comprising obtaining data representing a first image generated by a first sensor and a second image generated by a second sensor, wherein each of the first and second images includes a plurality of pixels; determining, for each pixel of the plurality of pixels included in the first image, whether the pixel is a boundary pixel associated with a boundary of an object that is represented in the first image; determining, from a plurality of candidate penalty values and for each pixel in the first image, an optimized penalty value for the pixel; generating an optimized cost function for the first image based on the optimized penalty values for the plurality of pixels; and generating a depth image for the first image based on the optimized cost function.

20 Claims, 5 Drawing Sheets

GENERATING STEREO-BASED DENSE DEPTH IMAGES

BACKGROUND

This specification relates to image processing, and more particularly, to stereo-based dense depth images.

In general, a depth image can include pixel-wise information relating to a distance from a portion of a scene represented by a corresponding pixel in an original image captured by sensors to an observation position of the sensors (e.g., a line connecting focal points of two image sensors). According to the density of pixel-wise distance information, depth images can be further classified into sparse depth images and dense depth images. For example, dense depth images can have distance information for each pixel in the original images. Conventional dense depth images can be generated, for example, from corresponding sparse depth images using interpolation or artificial intelligence models.

Dense depth images are widely used in computer graphics and computer vision. Techniques based on dense depth images can include generating image effects such as simulating shallow depths of field by blurring pixels in the original images to various degrees, simulating fog effect for objects in the original images, and generating suitable shadows and shades for objects in the original images, generating 3D models from 2D images, and rendering 3D scenes using Z-buffering and Z-culling, to name just a few examples. Furthermore, in some implementations, dense depth images can be used for localization and movement or pose control.

Conventional methods for extracting depth information to generate dense depth images from a scene can be generally classified into two categories—active methods and passive methods. Active methods, in general, relate to emitting light signals such as light beams or laser beams to objects in a scene and measuring respective round trip time periods for the light signals. Techniques and sensors using the active methods include Time-of-flight (TOF) cameras and Light Detection and Ranging (LIDAR) method. Passive methods, on the other hand, generally relates to generating multiple original images (e.g., one reference original image, and one or more target original images) for a particular scene using two or more sensors (e.g., stereo cameras) with known relative displacements and poses, and generating a depth image for each pixel in the original images by minimizing photometric differences after projections (e.g., rectification).

SUMMARY

The techniques described in the following specification relate to generating dense depth images using passive methods to extract depth information.

More specifically, because the active methods (e.g., TOF or LIDAR cameras) obtain depth information for objects in a particular scene by measuring a round trip time period for each emitted light signal, the performance of the active methods can be susceptible to conditions such as weather conditions (e.g., raining and snowing), external interference, and limited power for emitting light sources. In addition, the active methods typically require high-precision hardware for accurately measuring the round trip time periods, which increases the cost for obtaining suitable depth images, and renders the active methods hard to scale.

Passive methods can be advantageous when compared with active methods in that conventional passive methods can generate depth images at a lower cost and with higher robustness for different weather, inference, and power conditions. One of the conventional passive methods can generate depth images by minimizing photometric differences (e.g., costs) with constraints in pixel matching processes and smoothness constraints in optimization processes. More specifically, the smoothness constraints are used to penalize discontinuities in depths values for all pixels in depth images. Another example conventional passive method includes smoothness constraints for depth discontinuity based on pixel-wise color information. However, because the above-mentioned conventional passive methods apply uniform smoothness constraints for all pixels or respective smoothness constraints based on pixel-wise color information, the output depth images can sometimes be inaccurate. For example, the depth images generated by the conventional passive methods often cannot be suitably related to respective objects presented in the original images. As another example, the depth images may present substantial discontinuities within the same objects captured in the original images.

This specification describes techniques relating to generating an accurate depth image from one or more original images by minimizing an optimized cost function. More specifically, the optimized cost function is generated based on optimized penalty values customized for pixels that are located on the boundaries of objects captured in the original images. The described techniques further relate to generating predictions of boundary pixels using machine learning models, and determining the optimized penalty values for boundary pixels based on pixel-wise saliency information.

The term "sensor" as used throughout the specification stands for all kinds of suitable optical sensors for obtaining information for a scene. For example, the sensors can include an image sensor (e.g., digital single-lens reflex (DSLR) cameras), a laser sensor, or a video sensor.

The term "original image" throughout the specification stands for data collected by the aforementioned sensors. For example, the original images can include image data corresponding to a photo or a video clip captured by the DSLR camera.

The term "boundary pixel" as used throughout the specification stands for a pixel substantially representing a boundary of an object with respect to a background, or a boundary for an object of two or more partially overlapped or intersected objects captured in the original images. More specifically, boundary pixels for an object can include pixels at the outermost edge of an object presented in the original image. In addition, the boundary pixels can include pixels of a particular width. For example, the boundary pixels can have a width of a single pixel, two pixels, or five pixels from the periphery of the object. The width of boundary pixels can be determined based on the size of the object, the size of the original images, or the resolution of the original images.

The term "cost function" as used throughout the specification stands for a target function representing photometric differences to be minimized for generating a depth image from an input image. The cost function can receive input positions for each pixel in the original images, directions for generating cost paths, and particular disparity levels, and output particular values (e.g., a cost value) representing a measure of the photometric differences. The term "cost values" represent values as output from a cost function for processing particular inputs (e.g., a particular pixel at a particular disparity level). In general, the cost function for an input map includes multiple pixels, so that one cost function can generate multiple cost values each for a particular pixel. The described techniques relate to optimizing the functional form of a cost function for generating an accurate depth image, details of which are described below.

For simplicity, in the following specification, the term "original image" is also referred to as an image, the term "dense depth image" is also referred to as depth image, and the term "cost value" is also referred to as a cost.

Particular embodiments of the subject matter described in this specification can be implemented to realize one or more of the following advantages.

The techniques described below can improve the accuracy of generating a depth map from one or more images representing a scene. More specifically, the techniques described below include respective smoothness penalties for boundary pixels in the images, which relax the requirement for depth continuity across object boundaries. Thus, the accuracy of the depth map is significantly increased as compared to conventional techniques. In addition, the penalty values are optimized for boundary pixels and, optionally, the other pixels, so that the generated depth image can also substantially maintain geometric details of the objects captured in the images (e.g., shapes and poses of the objects). For example, details such as human fingers and hair strands captured in the original images are preserved when generating a depth map using the described techniques, in contrast to conventional techniques that might sacrifice or even omit geometric details to improve overall accuracy of a generated depth map.

Moreover, the techniques described below can be easily scaled up and pipelined for efficiently processing larger input images, or a large number of input images. More specifically, a system configured to perform the described techniques can pipeline the process of obtaining optimized penalty values and optimizing a corresponding cost function in a distributed manner. For example, the system can first generate multiple candidate cost functions based on multiple candidate penalty values. The system can then assign each of the candidate cost functions to a respective computing device to compute respective cost values using parallel operations. The system can then determine the optimized penalty values and the optimized cost function based on the respective cost values.

Furthermore, the techniques described in this specification can perform robustly for input images captured in varied conditions. The smoothness penalty values for boundary values are optimized based on pixel-wise saliency information. A system adopting the described techniques can generate accurate depth images from input images captured in various conditions, which can include images captured using the same camera yet under different background light or weather conditions, captured at the same location yet including a different number, size, color, and positions of objects, and captured for the same scene using different cameras with different light source powers, to name just a few examples.

In addition, the techniques described below can further improve computation efficiency by generating predictions of boundary pixels using machine learning models without identifying texture and classification information for the input images. This can improve computation efficiency because it is often difficult to apply a common machine learning model for generating predictions of texture and classification of each object for input images with varied image sizes, each including a different number and types of objects The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
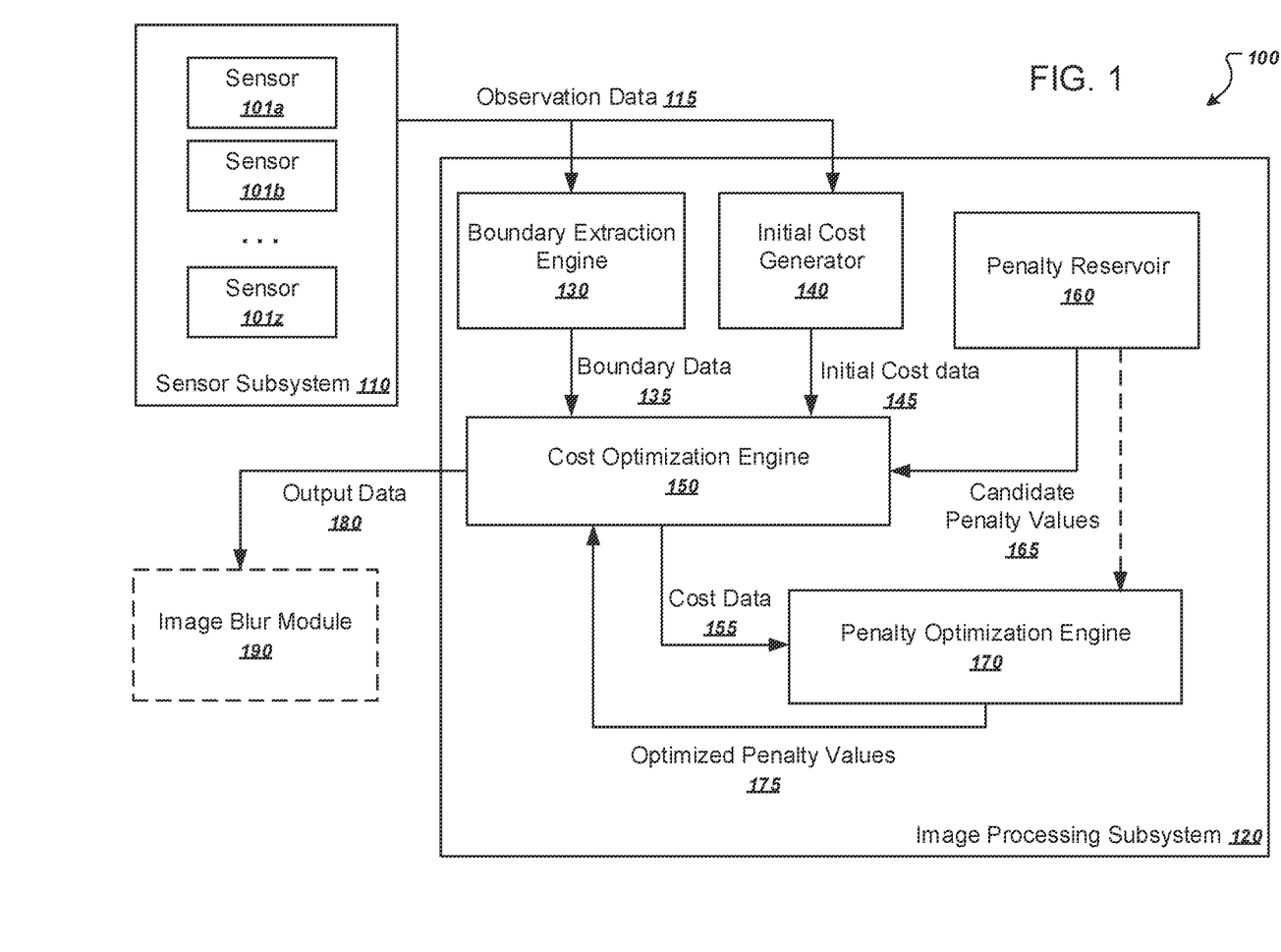
FIG. 1 illustrates an example system configured to generate an optimized depth image using optimized penalty values.

FIG. 1 illustrates an example system 100 configured to generate an optimized depth image using optimized penalty values. In general, the system 100 is configured to optimize a stereo-based dense depth image generated from image data.

As shown in FIG. 1, the system 100 configured to perform the techniques described in this specification can include an image processing subsystem 120 configured to process the input observation data 115 to generate image data with depth information as output data 180. The observation data 115 can be original images captured by one or more cameras, multiple pairs of images for stereo-based analysis, or filtered images according to particular image processing requirements. The output data 180 can include depth images (or equivalently, depth maps) or disparity maps generated from two or more images captured for a scene.

In some implementations, the system 100 can further include a sensor subsystem 100 having multiple sensors 101a-101z (e.g., cameras) configured to collect image data (e.g., images or videos) of a particular scene and provide the collected image data to the image processing subsystem 120 as observation data 115. The sensor subsystem 100 can include an audio-visual (AV) device (e.g., an AV streaming mixer that includes or communicably connects with multiple cameras, or a mobile device (e.g., smartphones, tablets, or laptops) including multiple cameras, to name just a few examples.

Alternatively, the sensor subsystem 110 can pre-process the collected image data to generate observation data 115. For example, the sensor subsystem 110 can filter the image data based on criteria such as image quality and the required number of images, or generate multiple image pairs for the image processing subsystem 120. Each of the multiple image pairs can include a reference image captured by a first sensor for a scene, and a target image captured by a second sensor for substantially the same scene, yet the second sensor is located in a different position from the first sensor.

To generate output data 180, the image processing subsystem 120 can process the received observation data 115 (e.g., image pairs). The processing can include determining boundary pixels in at least a portion of the observation data 115 (e.g., a reference image of an image pair), determining optimized penalty values based on pixel-wise saliency information to generate an optimized cost function, and obtaining depth information as a result of minimizing cost values from the optimized cost function. The functioning of the image processing subsystem 120 are described in detail below.

The image processing subsystem 120 can provide the output data 180 (e.g., depth images or disparity images) with the depth information to an external device, system or subsystem for further analysis or operations. For example, the external device, system or subsystem can include an image blur module 190 that is configured to process the received depth information for images and blur corresponding pixels in the images to replicate a depth of field effect, i.e., the pixels in the image that are located in a farther location of a scene or not around the focal distance of the camera can be automatically blurred by the image blur module 190. As another example, the external module can include a 3D modeling system configured to generate a 3D model for the scene captured by 2D images.

Referring back to image pairs of the observation data 115, the sensor subsystem 110 can generate image pairs from image data collected by sensors 101a-101z (also numbered as 101 for multiple sensors), as described above. More specifically, the sensor subsystem 100 can arrange sensors 101 at different locations for capturing respective images presenting substantially the same scene, set a first image by the first sensor 101a as a reference image, set a second image by the second sensor 101b as a target image, and generate a first image pair including the first image and second image. In general, the subsystem can set multiple images captured by respective sensors as reference images and pair the reference images with one or more target images captured by other sensors to form multiple image pairs. In some implementations, the observation data 115 includes only respective images captured by respective sensors, and it is the image processing subsystem 120 that generates image pairs for further operations based on the observation data 115.

The image processing subsystem 120 can include a boundary extraction engine 130 configured to obtain boundary information (e.g., determine boundary pixels) in the input observation data 115, a raw cost generator 140 configured to generate raw cost information when correlating pixels between image pairs, a penalty reservoir 160 configured to store and provide penalty values, a penalty optimization engine 170 configured to determine optimized penalty values based on pixel-wise saliency information, and a cost optimization engine 150 configured to generate an optimized cost function based at least on the optimized penalty values. The above-mentioned components included in the image processing subsystem 120 are described in greater detail below.

The boundary extraction engine 130 can receive observation data 115 and extract boundary information from the observation data 115. More specifically, the boundary extraction engine 130 can process a reference image of an image pair in the observation data 115 using a machine learning model and generate predictions on which pixels in the reference images are boundary pixels. The image processing subsystem 120 can associate each pixel in the reference image with the predicted boundary information, and store the boundary information in a memory device for further operations. The details of the machine learning model performed by the boundary extraction engine 130 are described below in connection with FIG. 2.

The initial cost generator 140 can receive observation data 115 to generate an initial cost function for all pixels in the reference images. The initial cost function can be used to generate an optimized cost function in the image processing subsystem 120. More specifically, for each image pair in the observation data 115, the initial cost generator 140 can perform a block matching process for each pixel in the reference image of the image pair with one or more pixels in the target image of the image pair. During the block matching process, the initial cost generator 140 is configured to generate a matching cost function for the image pair, and search, for a corresponding pixel in the reference image, a matching pixel, if any, in the target image within a search range of multiple pixels. A disparity level, an input to the matching cost function, can determine the search range.

The matching process is constrained by the matching cost function so that the system can obtain matching pixels by minimizing a matching cost value generated from the matching cost function. The matching cost function can receive input positions of a particular pixel and a disparity level for determining a search range. The initial cost generator 140 can automatically generate a set of disparity levels for the block matching process. In some implementations, the user can determine and provide the disparity levels to the initial cost generator engine 140 or the image processing subsystem 120 through one or more suitable user interfaces. In addition, the initial cost generator 140 can optionally generate an initial path cost function, which includes uniform smoothness penalty values for each pixel in the reference image. That said, the initial cost function for each pixel can include the corresponding matching cost function, and optionally the corresponding initial path cost function for the reference image.

The penalty reservoir 150 is configured to store and provide multiple candidate penalty values 165 to the cost optimization engine 150, and optionally the penalty optimization engine 170, to determine optimized penalty values. The candidate penalty values 165 stored in the penalty reservoir 160 can be preset by the image processing subsystem 170 automatically or by a user through any suitable user interface. In some implementations, the penalty reservoir 160 is included in a memory device or a portion of the physical memory of the image processing subsystem 120. The candidate penalty values 165 can include three, six, and ten different values, e.g., 20, 40, 80, 160, 320, to name just a few examples. In general, the candidate penalty values 165 can be any suitable real numbers. In particular, in some cases, each of the candidate penalty values can be normalized to be a real number between zero and one.

The penalty optimization engine 170 is configured to determine optimized penalty values 175 for at least boundary pixels of a reference image from the candidate penalty values 165. More specifically, the penalty optimization engine 170 can receive cost data 155 from the cost optimization engine 150 based on candidate penalty values, and determine the optimized penalty values for the boundary pixels based on pixel-wise saliency information. The details of determining the optimized penalty values using saliency information are described below.

After determining the optimized penalty values, the penalty optimization engine 170 can provide them to the cost optimization engine 150 to generate an optimized cost function, later used by the image processing subsystem 120 to output a depth image or a disparity image for the input image pair.

More specifically, the cost optimization engine 150 can receive input boundary data 135 indicating boundary pixels, initial cost data 145 characterizing the matching cost function for the input image, and multiple candidate penalty values 165. For each pixel of the boundary pixels in a reference image, the cost optimization engine 150 can generate multiple candidate cost functions based on different candidate penalty values, minimize a cost from each candidate cost function to obtain a candidate disparity level, and then generate the cost volumes based on the candidate disparity levels. The cost optimization engine 150 can generate and provide the cost data 155 characterizing the cost volumes to the penalty optimization engine 170 for determining optimized penalty values 175 based on saliency information of the respective cost volumes. The details of generating respective cost volumes and determining optimized penalty values are described in connection with FIG. 3.

As described above, the cost optimization engine 150 can receive optimized penalty values 175 from the penalty optimization engine 170 and generate an optimized cost function for each pixel in the reference image. In some implementations, the respective cost values generated from each cost function (e.g., a matching cost function, a path cost function, or an optimized cost function) for the reference image are stored in respective tensor data structures, and details of the optimized cost functions are described below.

The system 100, or more precisely, the image processing subsystem 120, can generate a depth image or disparity image based on the optimized cost function for the input image (or the input image pair), and provide output data 180 that includes the depth or disparity image for an external module e.g., the image blur module 190, for additional operations, as described above.

Figure 2:
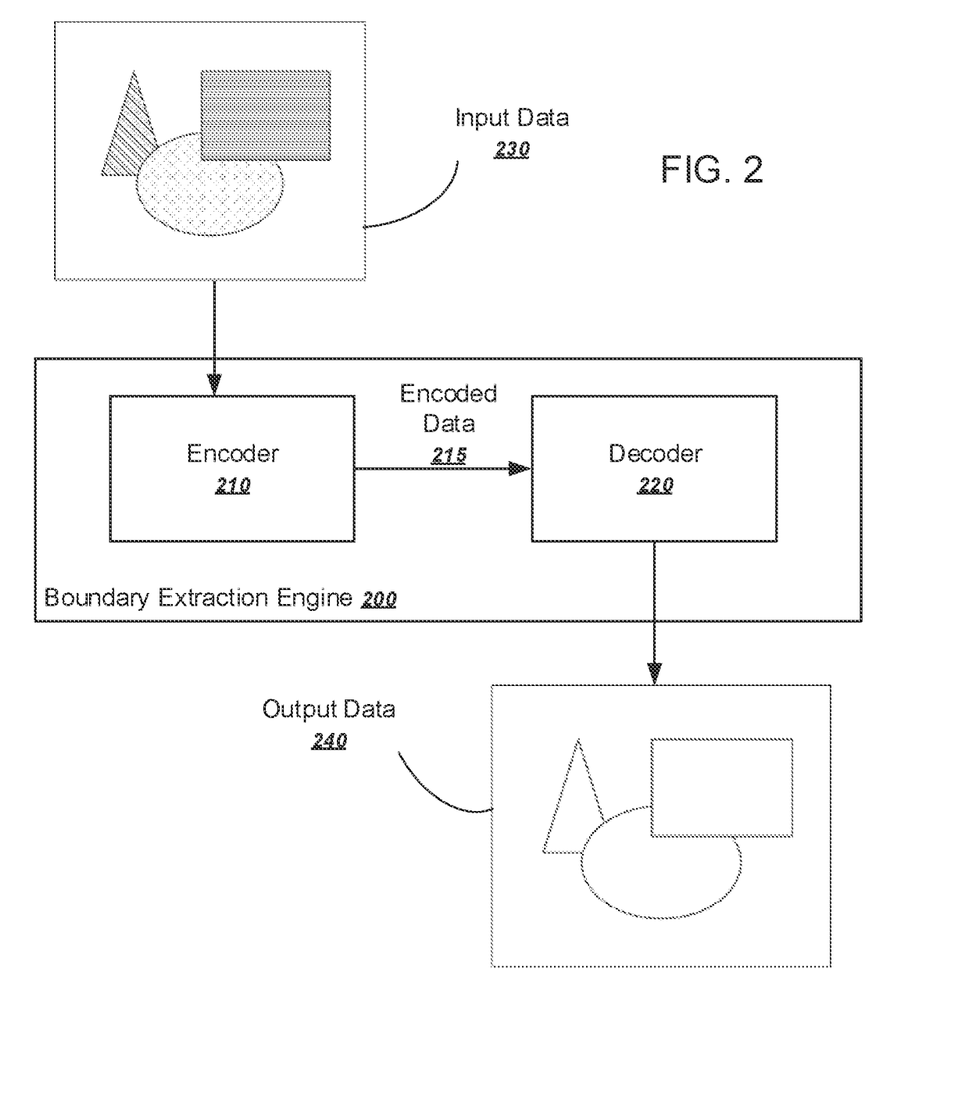
FIG. 2 illustrates an example boundary extraction engine configured to generate predictions of boundary pixels for input data.

FIG. 2 illustrates an example boundary extraction engine 200 configured to generate predictions of boundary pixels for input data 230. The boundary extraction engine 200 can be, for example, the boundary extraction engine 130 of FIG. 1.

The boundary extraction engine 200 can receive input data 230 including multiple images, and each image includes one or more objects for a respective scene. The input data 230 can be included in the observation data 115 and received, for example, from the sensor subsystem 100 as described with respect to FIG. 1. As shown in FIG. 2, the input data 230 can include an image of three objects, i.e., a triangle of a first texture representing a first category, an oval of a second texture representing a second category, and a rectangle of a third texture representing a third category. For ease of illustration, different textures are represented by different fill-up patterns for different objects.

The boundary extraction engine 200 can process the input data 230 and provide output data 240 for generating an optimized cost function. More specifically, the output data 240 includes predictions for each pixel of whether the pixel is a boundary pixel of an object. As described above, a boundary pixel is a pixel in an image located substantially on the outermost periphery of an object represented by multiple pixels in the image. In some implementations, boundary pixels can be pixels located in a region having a width of one or more pixels (e.g., one, two, or five pixels) from the outermost periphery within an object. For ease of illustration, the boundary pixels or boundary information in the output data 240 are represented by respective outlines for the objects (a triangle, an oval, and a rectangle) in the output data 240. The boundary pixels representing boundary information can also be referred to as semantic boundaries.

More specifically, the output data can include a likelihood for each pixel being associated with a boundary of an object in the image. For example, for three pixels located inside a first object, the boundary extraction engine 200 can predict a first pixel having a likelihood of 99% to be a boundary pixel of the first object in the image, a second pixel having a likelihood of 70% to be a boundary pixel of the first object, and a third pixel having a likelihood of 1% to be a boundary pixel of the first object. Then the boundary extraction engine 200 can determine the first pixel as a boundary pixel for the first object, while the second and third pixels are determined to be inner pixels for the first object.

In some implementations, the boundary extraction engine 200 can include a confidence level that indicates a probability or likelihood for it to be true that a pixel is predicted to have a particular likelihood of being a boundary pixel of an object. In addition, the boundary extraction engine 200 can further perform linear translation over the likelihood predictions (e.g., linear regression) to determine confidence levels.

Moreover, the boundary extraction engine 200 can include one or more criteria based on the predicted pixel-wise likelihoods to determine whether a pixel is a boundary pixel. For example, the criteria can be a threshold likelihood of 97%, and any pixels having a likelihood above the threshold can be determined as boundary pixels.

To generate the output data 240 representing semantic boundaries, the boundary extraction engine 200 can be configured to include one or more suitable trained machine learning models. For example, the machine learning models can include neural networks such as convolutional neural networks, fully convolutional networks (FCNs), and fully connected layers. The details of a general machine learning model are described below.

The machine learning models included in the boundary extraction engine 200 can further include an encoder 210 and a decoder 220. The encoder 210 can be a neural network including one or more neural network layers. For example, the one or more neural network layers can include convolutional layers followed by a fully connected layer. The encoder can receive input data 230 (e.g., an image) and map the input data to a feature map (or embeddings for processing natural language), represented by one or more vectors and tensors with real numbers. The encoder 210 can provide the encoded data 215, characterizing the above-noted feature map, to the decoder 215. The decoder 215 can also be a neural network including one or more neural network layers, yet these layers in the decoder are usually organized in an opposite orientation than those layers in the encoder 210. For example, the decoder 215 can include a fully connected layer followed by one or more convolution transpose layers. The decoder 215 can process the received encoded data 215, and generate a prediction for each pixel in the input image based on the feature map. In some implementations, the decoder 215 can generate a reconstructed output image substantially match with the input image with segmented predictions (e.g., pixel-wise predictions).

As a specific example, the encoder 210 and decoder 215 can be configured according to a UNet architecture, i.e., a symmetric architecture across two portions. The left portion can be considered to be at least a part of the encoder 210, which can include one or more convolution layers configured to perform convolutional computations for processing the input data (e.g., images) into output features (e.g., tensors represented in a feature map), pooling layers configured to perform max pooling or average pooling operations for the output features, and, optionally, dropout layers configured to nullify some features of the output features to mitigate overfitting. The right portion can be considered to be at least a part of the decoder 215, which can include one or more transposed convolution layers configured to un-sample features generated from the encoder 210 in the feature map, and, optionally, one or more convolution layers configured to perform concatenations to combine the un-sampled features and corresponding features generated from the encoder 210 to improve prediction accuracy.

In some implementations, the encoder 210 or decoder 215 can include techniques to reduce a total number of parameters of a network by including one or more depthwise convolution layers, which are configured to perform depth-wise convolutional operations in a fashion that the convolutional operations are performed for each input channel separately, and the output of the depthwise convolution layers has the same number of channels as the input. Optionally, the encoder 210 and decoder 215 can further include one or more point-wise convolution layers following the depthwise convolution layers to combine output features generated from the depthwise convolution layers.

Furthermore, the encoder 210 can include one or more blocks of layers, and the decoder 215 can include the same number of corresponding blocks of layers. Each block of the decoder 215 can receive, as input, output features generated by a corresponding block of the encoder 210. More specifically, the input features to a decoder block can be an aggregation of output features from a preceding decoder block and a corresponding encoder block. For example, the input features to the last decoder block can be a summation of the output features of a preceding decoder block and the first encoder block.

The machine learning models for generating output data 240 can be trained using particular training samples and following conventional training steps. The training examples can include images including pixels associated with boundary information. The loss function for training parameters of the machine learning model with the encoder 210 and decoder 215 can be a loss function representing a discrepancy between the input data and the reconstructed output data associated with predictions. In general, any suitable loss functions can be used for training the machine learning models, such as hinge loss and log loss, to name just a few examples. In some implementations, the boundary information for pixels in the training examples can be imported to the system 100 from external memory devices. Alternatively, users can manually determine boundary pixels in the training images.

Note that the output data 240 generated by the machine learning model omits some information from the input data. For example, the output data 240 can omit each pixel's texture and classification information in the input image. Because generating predictions on texture and classification required additional information from the input data (e.g., input image size, or pre-known texture and category information), by ignoring the texture and classification information for inference computations, the boundary extraction engine 200 can generate predictions for boundary pixels using the trained machine learning model more robustly and efficiently.

In general, the aforementioned machine learning model may be configured to receive any kind of digital data input and can be trained on the input to generate any kind of score, classification, or regression output based on the input. The input data item may comprise image data (which here includes video data), audio data, or text data, e.g., words or word pieces (or representations thereof, e.g., embeddings) in a natural language. The input data item may comprise sequential data, e.g., a sequence of data samples representing digitized audio or an image represented as a sequence of pixels, or a video represented by a sequence of images, or a sequence representing a sequence of words in a natural language.

In some implementations, the trained machine learning model can generate an output comprising a feature representation, which may then be further processed to generate a system output. For example the system output may comprise a classification output for classifying the input data item into one of a plurality of categories e.g., image, video, or audio categories (e.g., data representing an estimated likelihood that the input data item or an object/element of the input data item belongs to a category), or a segmentation output for segmenting regions of the input data item, e.g., into objects or actions represented in an image or video. Alternatively, the system output may be an action selection output in a reinforcement learning system.

In some implementations, the output may comprise another data item of the same or a different type. For example the input data item may be an image, audio, or text and the output data item may be a modified version of the image, audio, or text, e.g., changing a style, content, property, pose, and so forth of the input data item or of one or more objects or elements within the input data item; or filling in a (missing) portion of the input data item; or predicting another version of the data item or an extension of a video or audio data item; or providing an up-sampled (or down-sampled) version of the input data item. For example the input data item may be a representation of text in a first language and the output data item may be a translation of the text into another language, or a score for a translation of the text into another language. In another example an input image may be converted to a video, or a wire frame model, or CAD model, or an input image in 2D may be converted into 3D; or vice-versa. Alternatively, the input data item may comprise features derived from spoken utterances or sequences of spoken utterances or features derived therefrom and the output may comprise a score for each of a set of pieces of text, each score representing an estimated likelihood that the piece of text is the correct transcript based on the features. In another example the input data item may be an image, audio, or text and the output data item may be a representation of the input data item in a different format. For example the machine learning model may convert text to speech, or vice-versa (for speech recognition), or an image (or video) to text (e.g., for captioning). When generating an output comprising sequential data the machine learning model may include one or more convolutional, e.g., dilated convolutional layers.

In some implementations, the trained machine learning model is configured to receive an input data item and to process the input data item to generate a feature representation of the input data item in accordance with the model parameters. Generally, a feature representation of a data item is an ordered collection of numeric values, e.g., a vector that represents the data item as a point in a multi-dimensional feature space. In other words, each feature representation may include numeric values for each of a plurality of features of the input data item. As previously described the machine learning model can be configured to receive as input any kind of digital data input and to generate a feature representation from the input. For example, the input data items, which may also be also referred to as model inputs, can be images, portions of documents, text sequences, audio data, medical data, and so forth.

The feature representations can be provided as an input to another system e.g., for use in performing a machine learning task on the model inputs. Example tasks may include feature-based retrieval, clustering, near duplicate detection, verification, feature matching, domain adaptation, video based weakly supervised learning; and for video, e.g., object tracking across video frames, gesture recognition of gestures that are performed by entities depicted in the video.

If the inputs to the machine learning model are images or features that have been extracted from images, the output generated by the machine learning model for a given image may be scores for each of a set of object categories, with each score representing an estimated likelihood that the image contains an image of an object belonging to the category.

Figure 3:
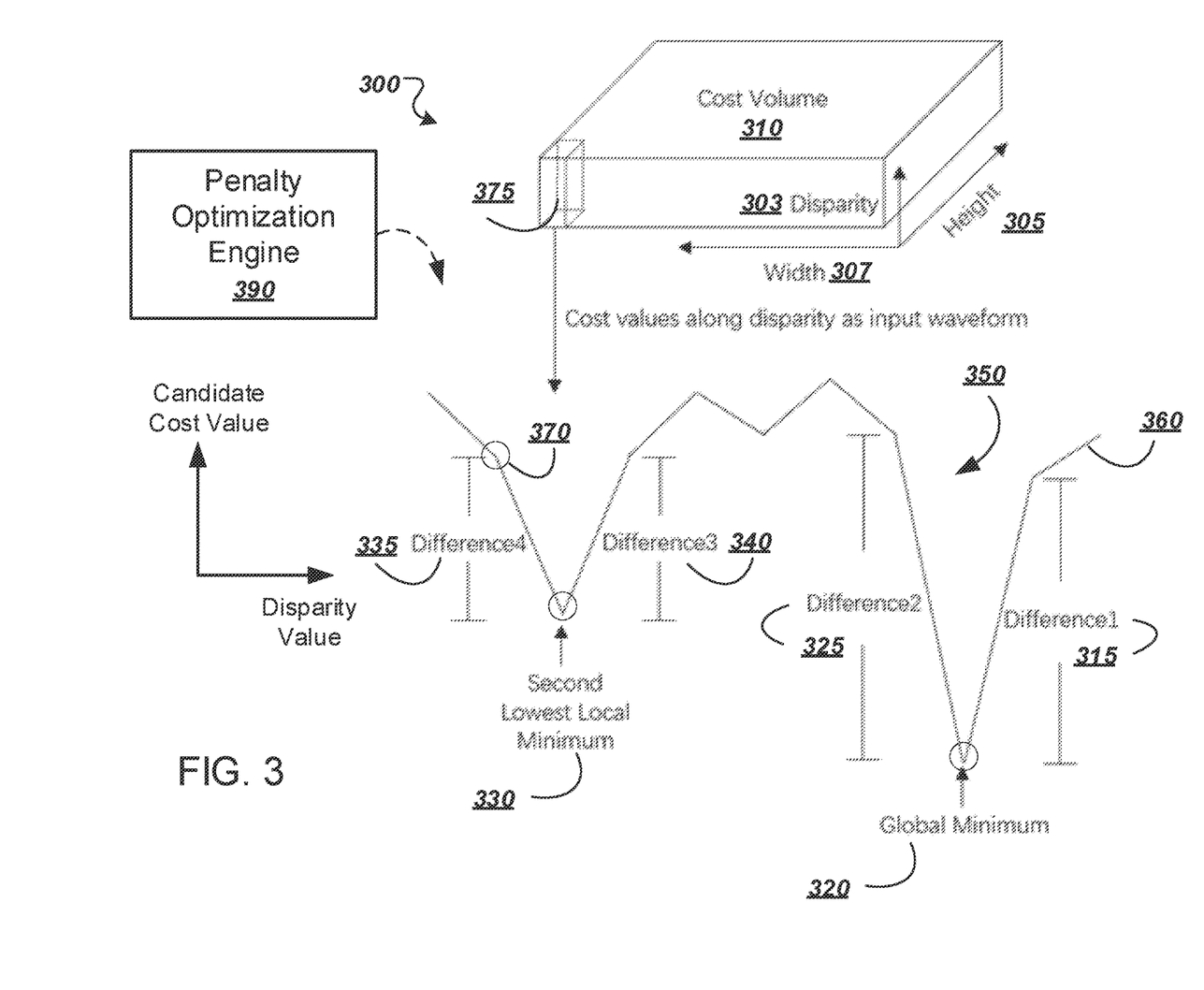
FIG. 3 illustrates an example approach adopted by an example penalty optimization engine configured to determine optimized penalty values based on morphological analysis.

FIG. 3 illustrates an example approach 300 adopted by an example penalty optimization engine 390 configured to determine optimized penalty values based on morphological analysis. The example penalty optimization engine 390 can be, for example, the penalty optimization engine 170 of FIG. 1.

As a preliminary matter before describing how the penalty optimization engine 390 can obtain the optimized penalty values, the system (e.g., system 100 of FIG. 1) can generate a cost function S having a functional form by aggregating multiple path cost functions $L_r$. Each path cost function $L_r$ is configured to measure costs for pixels along a path traversed in the direction r of the pixel located at (x, y) in a 2D coordinate frame at disparity level d, which can be formed as below:

$$L_r(x, y, d) = \qquad \text{Equation (1)}$$
$$C(x, y, d) + \min\{L_r(x-1, y, d), L_r(x-1, y, d-1) + P_1(x, y),$$
$$L_r(x-1, y, d+1) + P_1(x, y), \min_i L\_r(x-1, y, i) + P_2(x, y)\}$$

As shown in equation (1), the path cost function $L_r$ receives as input the location of a particular pixel at a disparity level d, where d belongs to a predetermined set of disparity levels D. The first term in the path cost function $L_r(x, y, d)$ represents a matching cost function C (x, y, d) for matching a pixel located at (x, y) in the reference image with a corresponding pixel in the target image using a search range determined by the disparity level d. Referring back to FIG. 1, in some implementations, the matching cost function C (x, y, d) for each pixel in the reference image is included in the initial cost function generated by the initial cost generator 140.

The second term in the path cost function $L_r(x, y, d)$ represents an accumulation of the lowest path cost function for a previous pixel along the direction r, with smoothness penalty terms $P_1(x, y)$ and $P_2(x, y)$. Note that both penalty terms $P_1$ and $P_2$ are functions of a pixel's position, which means that the smoothness penalty values in this specification depend on characteristics of pixels.

As an example, the penalty values generated from the penalty terms $P_1(x, y)$ and $P_2(x, y)$ for a pixel depend on whether the pixel is a boundary pixel of an object captured in an image. Note that the penalty terms can be considered as functions of pixel positions. Each of the penalty terms can return a respective penalty value based on an input pixel position.

In some implementations, the penalty terms $P_1(x, y)$ and $P_2(x, y)$ can have a functional form in condition of whether the input pixel is predicted to be a boundary pixel. For example, the penalty terms can include a step functional form for each pixel of all pixels in a reference image as below:

$P_1(x, y) =$
$$\begin{cases} P_1^b \text{ if the input pixel } (x, y) \text{ is predicted to be a boundary pixel} \\ P_1^o \text{ otherwise;} \end{cases}$$

and $P_2(x, y) =$
$$\begin{cases} P_2^b \text{ if the input pixel } (x, y) \text{ is predicted to be a boundary pixel} \\ P_2^o \text{ otherwise.} \end{cases}$$

The boundary extraction engine 130 can determine whether an input pixel is a boundary pixel, by performing inference operations of a machine learning model to predict a likelihood of a pixel to be a boundary pixel, and determining the pixel as a boundary pixel when the likelihood exceeds one or more particular criteria, as described above.

The system 100 can generate one or more sets of penalty terms by changing the parameters of the terms. As an example, the system 100 can pre-determine the penalty terms $P_1(x, y)$ and $P_2(x, y)$ to include a first set of parameters with $P_1^b=1$, $P_1^o=8$, $P_2^b=0.25$, and $P_2^o=2$. As another example, the system 100 can per-determine the penalty terms $P_1(x, y)$ and $P_2(x, y)$ to include a second set of parameters with $P_1^b=2$, $P_1^o=16$, $P_2^b=0.5$, and $P_2^o=4$.

In some implementations, the penalty terms $P_1(x, y)$ and $P_2(x, y)$ can have a likelihood functional from of $P_1(x, y)=P_{r1}*P_b(x, y)+P_{r1}^0*(1-P_b(x, y))$ and $P_2(x, y)=P_{r2}*P_b(x, y)+P_{r2}^0*(1-P_b(x, y))$, repectively. Note the term $P_b(x, y)$ is a function representing a likelihood of each pixel in an image being a boundary pixel for an object captured in the image, which is also referred to as a boundary likelihood map. The $P_b(x, y)$ function can be implemented using machine learning techniques as described above, and the $P_b(x, y)$ can be stored in a matrix data structure with each item of the matrix representing a likelihood, a determination, or a derived value based on the likelihood of a pixel being a boundary pixel predicted by a machine learning model. The term $P_{r1}$ and $P_{r2}$ can be constant real values to be determined for pixels that are more likely to be boundary pixels, and $P_{r1}^0$ and $P_{r2}^0$ can be constant real values for other pixels. The system 100 can select, from a plurality of candidate penalty values, a respective set of values for $P_{r1}$, $P_{r2}$, $P_{r1}^0$, and $P_{r2}^0$ based on, for example, particular criteria. The system 100 can also provide a user interface for a user to select values for these parameters. The details of generating the penalty terms $P_1(x, y)$ and $P_2(x, y)$ are described in more details below.

The system 100 can further aggregate the path cost functions $L_r$ for all directions r to generate an aggregated cost function S(x, y, d) for all directions at a disparity level d. The accuracy for a depth image increases with an increase in the total number of different directions summed in the aggregated cost function. The total number of different directions can be 4, 8, and 32, to name just a few examples. The aggregated cost function S(x, y, d) can be formed as below:

$$S(x,y,d)=\Sigma_r L_r(x,y,d) \qquad \text{Equation (2)}$$

The system 100 can select a disparity level d from the set of disparities D as the disparity value for a pixel based on the equation $d_0=\text{argmin}_d S(x, y, d)$, i.e., the disparity value $d_0$ for a pixel leads to a minimal aggregated cost value from the cost function S(x, y, d) for all disparity levels in the set D.

In some implementations, the system can generate respective cost values from the respective path cost functions $L_r$ and the corresponding aggregated cost function S, and store the cost values in a tensor form. For example, the cost values for a particular path cost function $L_r$ can be stored in a third order tensor, e.g., (H, W, $\hat{D}$), where H and W represents pixel size in height and width direction of an input image, and $\hat{D}$ represents the size of the set of disparity levels. The system 100 can further store the cost values for path cost functions $L_r$ in multiple directions in a fourth order tensor, e.g., (H, W, $\hat{D}$, R), where R represents a total number of directions. Since the aggregated cost function S is obtained by accumulating path cost functions $L_r$ in multiple directions, the system 100 can store the cost values generated from the aggregated cost function S in a third order tensor, e.g., (H, W, $\hat{D}$), similar to that of the a particular path cost function $L_r$.

As shown in FIG. 3, the system 100 can generate a cost volume 310 for a reference image based on a pixel's position and a respective disparity level for the pixel. For example, x represents a position (e.g., coordinate) along the width direction 307, y represents a position along a height direction 305, and each pixel located at a respective width and height coordinate can have a respective cost value at each disparity level along the disparity axis 303.

Referring back to the penalty optimization engine 390, as described above, which is configured to determine optimized penalty values generated by optimized penalty terms, noted as $\hat{P}_1(x, y)$ and $\widetilde{P_2}(x, y)$, from multiple candidate penalty values generated by candidate penalty terms, noted as $\hat{P}_1(x, y)$ and $\hat{P}_2(x, y)$. The functional form of candidate penalty terms and optimized penalty terms can be constructed similarly to the penalty terms as described above (e.g., step functional form or likelihood functional form). These system can choose values including 0.25, 0.5, 1, 2, 4, 8, and 16 for these terms to generate corresponding optimized penalty values and candidate penalty values, to name just a few examples.

Note that penalty values, candidate penalty values, and optimized penalty values are associated with each pixel in a reference image. In some implementations, the system 100 can predetermine a common set of penalty values for each pixel in an image (e.g., $P_1(x, y)=16$ and $P_2(x, y)=4$ for all pixels), and overwrite one or more constant coefficients for boundary pixels. In some implementations, the system 100 can directly determine the above-noted penalty terms and corresponding penalty values for all pixels in the reference image without overwriting.

In some implementations, the candidate penalty values can vary from one another by a constant multiplier, for example, the constant multiplier can be 2, 4, and 8. When the constant multiplier is 2, as an example, a first pair of candidate penalty values from $\hat{P}_1(x, y)$ and $\hat{P}_2(x, y)$ for boundary pixels can be 1 and 0.25, respectively, a second pair of candidate penalty values for boundary pixels can be 2 and 0.5, respectively, and a third pair of candidate penalty values can be 4 and 1, respectively.

To determine the optimized penalty values, the penalty optimization engine 390 can first provide the plurality of candidate penalty values 165 to an cost optimization engine (e.g., the cost optimization engine 150), and the cost optimization engine 150 can generate multiple candidate cost functions $\hat{S}$ for each pixel in the reference image based on the predictions generated from an boundary extraction engine (e.g., the boundary extraction engine 130 of FIG. 1).

Each candidate cost function of the plurality of candidate cost functions $\hat{S}$ can include a candidate path cost function $L_r$ in a direction r based on a pair of candidate penalty values (e.g., values generated by a pair of candidate penalty terms $\hat{P}_1(x, y)$ and $\hat{P}_2(x, y)$ in a corresponding candidate cost function). Alternatively or in addition, each candidate cost function $\hat{S}$ can include an aggregated cost function based on the candidate penalty values.

The cost optimization engine 150 can then provide cost data 155 characterizing the plurality of candidate cost functions to the penalty optimization engine 390. The cost optimization engine 150 can generate multiple cost volumes 310 (or candidate cost volumes 310 because they are generated based on candidate penalty values) associated with respective disparity levels for each pixel in an image given the candidate cost functions.

In response, the penalty optimization engine 390 can determine the optimized penalty values generated from terms $\widetilde{P}_1(x, y)$ and $\widetilde{P}_1(x, y)$ for each boundary pixel based on a saliency value. More specifically, the engine 170 can perform morphological analysis over disparity levels and candidate cost values associated with respective candidate penalty values to determine the saliency values. As described above, the candidate penalty values can be outputs generated from candidate penalty terms $\hat{P}_1(x, y)$ and $\hat{P}_2(x, y)$, or can be candidate values for the constant coefficients in the candidate penalty terms $\hat{P}_1(x, y)$ and $\hat{P}_2(x, y)$.

To determine a saliency value, the penalty optimization engine 390 is configured to generate multiple waveforms for each pixel based on the multiple candidate cost volumes to determine multiple candidate saliency values for the pixel, and select one candidate saliency value from the multiple candidate saliency values as the saliency value based on one or more criteria. The details of generating the saliency value is described below in connection with FIG. 5.

Referring back to FIG. 3, to generate a waveform for a pixel in a reference image, the penalty optimization engine 390 can select a cost volume from the multiple candidate cost volumes, obtain respective cost values for all disparity levels for the pixel from the selected cost volume, and generate the waveform based on the respective candidate cost values and associate disparity levels. As an example, the waveform can include a two-dimensional data structure with values along the vertical direction representing candidate cost value for the pixel, and values in the horizontal plane representing disparity level for generating a corresponding candidate cost value for the pixel. As another example, the waveform for the pixel can be a discrete line function representing the respective disparity levels d and corresponding candidate cost values based on corresponding candidate penalty values $\hat{P}_1(x, y)$ and $\hat{P}_2(x, y)$.

As shown in FIG. 3 and without losing generality, a waveform 350 for a pixel in a reference image can be plotted as a line graph 360 in a 2D coordinate frame, in which the horizontal axis represents disparity d and the vertical axis represents candidate cost value generated at a corresponding disparity level from a candidate cost function including candidate penalty terms $\hat{P}_1(x, y)$ and $\hat{P}_2(x, y)$. In this waveform 350 for the pixel, each vertex (e.g., a vertex numbered as 370) represents a pixel 375 at a possible disparity level and a candidate cost value obtained from the respective cost volume generated at the disparity level and based on corresponding candidate penalty values $\hat{P}_1(x, y)$ and $\hat{P}_2(x, y)$.

The penalty optimization engine 390 can identify both local and global minimal candidate cost values in the line graph 360. For example, as shown in FIG. 3, the penalty optimization engine 390 can determine a global minimum 320 and a second lowest local minimum 330 in the line graph 360. In response, the engine 170 can compute sharpness values, i.e., absolute differences of the candidate cost values between a neighboring vertex and a corresponding minimum (e.g., 320 and 330) in the line graph 360. For example, as shown in FIG. 3, the engine 170 can determine a Difference 1 (numbered as 315) and Difference 2 (numbered as 325) in the candidate cost values between the global minimum 320 and its respective neighboring vertices. Similarly, the engine can further determine a Difference 3 (numbered as 340) and Difference 4 (numbered as 335) in the candidate cost values between the local minimum 330 and its respective neighboring vertices.

The penalty optimization engine 390 can determine a candidate saliency value for the pixel based on the sharpness values. For example, in response to determining that there is only one minimum candidate cost value presented in the waveform 350, the engine 170 can generate a candidate saliency value for the boundary pixel based on a summation of sharpness values associated with the minimum. As another example and in connection with FIG. 3, in response to determining the there are two or more minimums presented in the waveform 350, the engine 170 can determine a candidate saliency value as below:

Candidate Saliency Value=Difference 1+Difference 2−Difference 3−Difference 4    Equation (3).

Figure 5:
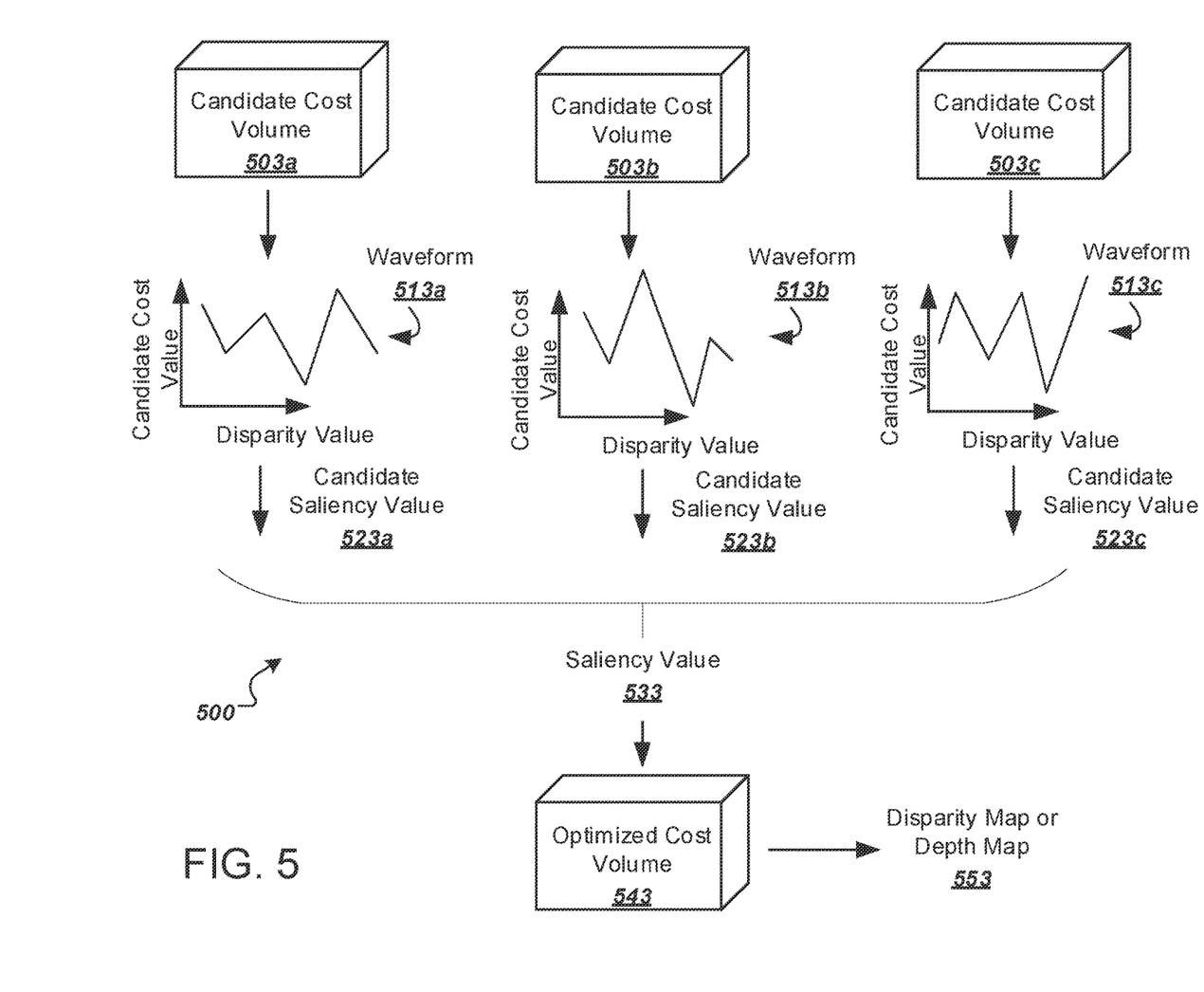
FIG. 5 illustrates an example process of generating the saliency value based on one or more waveforms.

As described above, the penalty optimization engine 390 can generate multiple waveforms for each pixel in the reference image to determine a saliency value. Each waveform is generated from a candidate cost volume based on different candidate penalty values. More specifically, FIG. 5 illustrates an example process 500 of generating the saliency value based on one or more waveforms (513a-c). The process can be performed by an example penalty optimization engine, for example, the penalty optimization engine 170 of FIG. 1 or 390 of FIG. 3.

As shown in FIG. 5 and in connection with FIG. 3, the penalty optimization engine 390 can generate multiple candidate cost volumes (503a-c) for all pixels in a reference image. Each candidate cost volume 503a, 503b, and 503c is generated from a respective candidate cost function including respective candidate penalty values. As described above, the three dimensions of a cost volume each represent a disparity level, a first coordinate for pixels in a first direction, and a second coordinate for pixels in a second direction perpendicular to the first direction.

For each pixel of all pixels in the reference image, the penalty optimization engine 390 can generate a respective waveform from a respective cost volume of the multiple cost volumes. For example, the penalty optimization engine 390 can generate, for the pixel 375 of FIG. 3, a first waveform 513a from the first candidate cost volume 503a, a second waveform 513b from the second candidate cost volume 503b, and a third waveform 513c from the third candidate cost volume 503c. Each waveform (513a-c) can be represented as line graphs, as described above.

The penalty optimization engine 390 can then determine a respective candidate saliency value for each waveform, as described above. As shown in FIG. 5, the penalty optimization engine 390 can generate a first candidate saliency value 523a from the first waveform 513a, a second candidate saliency value 523b from the second waveform 513b, and a third candidate saliency value 523c from the third waveform 513c. The value of each candidate saliency value can be determined as described above, e.g., by Equation (3).

To determine the saliency value from the candidate saliency values 523a-523c, the penalty optimization engine 390 can include one or more pre-determined criteria and compare each candidate saliency value against the pre-determined criteria. The criteria can be, for example, a threshold value for the candidate saliency values, or a threshold value for a difference between two candidate saliency values. The threshold value can be a suitable real number, for example, 1, 4, 10, 20, and 100.

In some implementations, the penalty optimization engine 390 can filter out candidate saliency values that do not satisfy the threshold value, and select, from the remaining candidate saliency values that satisfy the threshold, a candidate saliency value as the saliency value for a pixel. In some implementations, the penalty optimization engine 390 can select the minimum candidate saliency value from the remaining candidate saliency values as the saliency value for the pixel.

For example and in connection with FIG. 5, assuming the first candidate saliency value 523a is 1.5, and the second candidate saliency value 523b is 5, the third candidate saliency value 523c is 100, and the threshold value for candidate saliency values is 3, the penalty optimization engine 390 is configured to filter out the first candidate saliency value 523a because it is smaller than the threshold value, and select the candidate saliency value 523b as the saliency value because it is the minimum value among the remaining candidate saliency values.

After determining the saliency value for the pixel, the penalty optimization engine 390 can determine, as the optimized cost volume 543, the candidate cost volume associated with the saliency value for the pixel. For example, as shown in FIG. 5, the penalty optimization engine 390 can determine the candidate cost volume 503b as the optimized cost volume 543.

After determining the cost volume 543 for the pixel, the penalty optimization engine 390 can select, as the optimized penalty values $\tilde{P}_1(x, y)$ and $\widetilde{P_1}(x, y)$ for the pixel, the candidate penalty values for generating the optimized cost volume 543 from the multiple candidate penalty values. The penalty optimization engine 390 therefore can generate optimized penalty values for the lowest cost values with adequate saliency values.

The penalty optimization engine 390 can repeatedly perform the above-noted process to determine optimized penalty values for all pixels in the reference image. Referring back to FIG. 1, the penalty optimization engine 390 can then provide the determined optimized penalty values 175 to the cost optimization engine 150 to generate output data 180, which at least includes the depth information (e.g., disparity map or depth map 553) for each pixel in the reference image.

Note that even though there are only three candidate cost volumes generated in the process 500 for the ease of illustration, the penalty optimization engine 390 can generate more than three candidate cost functions, for example, 5, 10, 20, and 100 candidate cost volumes associated with respective candidate penalty values.

Figure 4:
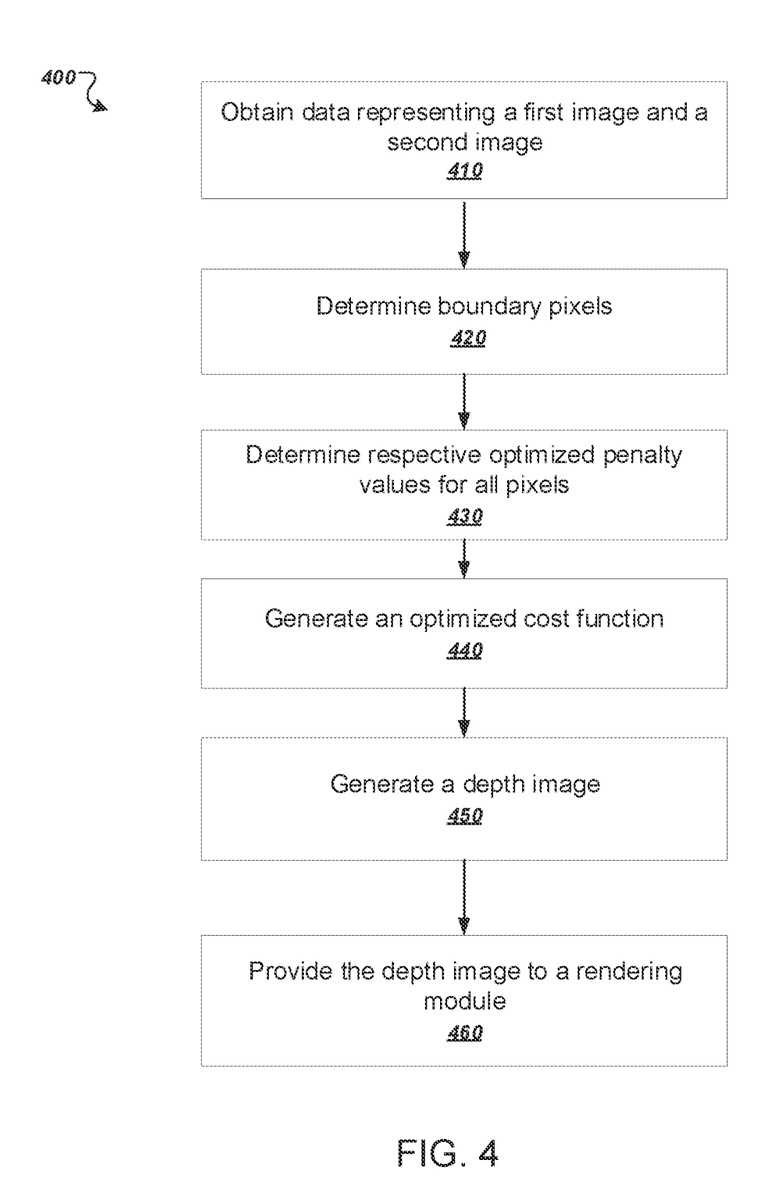
FIG. 4 is a flow diagram of an example process of generating an optimized depth image using the system of FIG. 1.

FIG. 4 is a flow diagram of an example process 400 of generating an optimized depth image using the system 100 of FIG. 1. For convenience, the process 400 will be described as being performed by a system of one or more computers located in one or more locations. For example, a system for optimizing stereo-based dense depth images, e.g., the system 100 of FIG. 1, appropriately programmed, can perform the process 400.

The system obtains observation data collected by a sensor subsystem, e.g., multiple sensors in the sensor subsystem 110 as described with respective to FIG. 1. More specifically, the system obtains data representing a first image of a particular scene generated by a first sensor and a second image of the particular scene generated by a second sensor (410). The particular scene can include one or more objects, and each of the first and second images can include multiple pixels. In some implementations, the system can combine the first image and the second image to form an image pair. In the image pair, the first image can be a reference image captured by a reference camera, and the second image can be a target image captured by an auxiliary camera.

For each pixel of the plurality of pixels included in the first image, the system determines whether the pixel is a boundary pixel associated with a boundary of an object detected in the particular scene (420).

More specifically, when determining whether a pixel in the first image is a boundary pixel, the system can be configured to include a trained machine learning model for generating a prediction for the pixel when processing the input image. The machine learning model can include an encoder and decoder, e.g., encoder 210 and decoder 220 as described above with respect to FIG. 2. The machine learning model can be trained using training samples (e.g., images) with boundary pixels determined by a user. The output prediction from the trained machine learning model for performing inference operations over an input image can include pixel-wise likelihood for a pixel being associated with a boundary of an object represented by multiple pixels in the first image. The system can further include criteria including a likelihood threshold, any pixels having a likelihood above the threshold value can be determined as boundary pixels.

Before performing the optimization process, the system can first generate an initial cost function for each pixel included in the first image and generate initial cost values for all the pixels using the initial cost function. The initial cost value can represent a discrepancy between a reference pixel in the first image and a corresponding pixel in the second image when the system performs a block matching process to find the corresponding pixel for the reference pixel among a portion of pixels in the second image within a search range. More specifically, the search range can be determined by a disparity level of a set of predetermined disparity levels. The initial cost function can include a matching cost function for measuring the performance of the block matching process between a pixel in the first image (e.g., the reference image) and one or more pixels within the search range in the second image (e.g., the target image). The matching cost function for each pixel can receive as input a pixel position and a disparity level for determining the search range, and output a matching cost value contributing to the aggregate cost values.

The system determines, from a group of candidate penalty values (e.g., candidate penalty values 165) and for all pixels of the reference image, respective optimized penalty values for the pixels (430).

To determine the optimized penalty values, as described above, the system can first obtain the group of candidate penalty values from a penalty reservoir (e.g., the penalty reservoir 160). The candidate penalty values can be arranged in a sequence based on the magnitude of each of the candidate penalty values.

According to the sequence, the system can generate a group of candidate cost functions based on each pair of candidate penalty values of the candidate penalty values. Based on the candidate cost functions, the system can generate a respective set of cost volumes for each pixel in the first image (e.g., the reference image).

Then, the system can determine a saliency value for each pixel using morphological analysis. The system can perform the morphological analysis by generating multiple waveforms for each pixel, each waveform generated based on the respective cost values from a corresponding cost volume at different disparity values for the pixel. In response, for each pixel in the first image, the system can select, as the optimized penalty value for the pixel, a candidate penalty value from the candidate penalty values based on the saliency value for the pixel.

More specifically, the system can first generate a waveform for a pixel plotted in a line graph. The system can determine one or more minimum values in the waveform (or the line graph), for example, a global minimum of disparity value, or a second-lowest local minimum of disparity value. The system can then generate a candidate saliency value for the pixel at least based on a minimum disparity value in the waveform. More specifically, the system can generate a candidate saliency value based on absolute differences in the disparity value of a minimum and corresponding neighboring vertices with respective disparity values in the waveform.

The system can generate candidate saliency values for the pixel for all candidate cost volumes, and determine, as the saliency value for the pixel, from the candidate saliency values based on one or more criteria, as described above.

The system can then determine, as the optimized cost volume, a candidate cost volume that represents the saliency value from the respective candidate cost volumes. The system can then determine, as the optimized penalty values, the candidate penalty values for generating the optimized cost volume. The system can repeatedly perform the above-noted process to determine optimized penalty values for all pixels in the reference image.

After the system determines the optimized penalty values for every pixel in the reference image, the system can generate an optimized cost function based on the optimized penalty values (440). As described above, for pixels in the first image (e.g., the reference image), the system can first generate respective optimized path cost functions along multiple directions using the optimized penalty values. The system can then generate the optimized cost function for all pixels in the first image by aggregating the respective optimized path cost functions in multiple directions (i.e., generating the optimized aggregated cost function).

It is noted that the system can generate optimized penalty values for all pixels in the reference image at the same time, and that the optimized penalty values for boundary pixels are generally different and smaller than those for non-boundary or inner pixels.

Even though the system is configured to be able to determine optimized penalty values for all pixels in a reference image, in some implementations, the system can first perform the above-noted process to determine optimized penalty values for boundary pixels, and for pixels in the first image that are not boundary pixels (i.e., non-boundary pixels), the system can assign a common penalty value to be shared by these pixels. In some implementations, after determining optimized penalty values for boundary pixels, the system can increase a common penalty value for all of the non-boundary pixels, which can reduce computational cost.

The system then generates a depth image for the first image based on the cost values from the optimized cost function (450). As described above, the system can select disparity values for each pixel that generate respective minimum cost values from the optimized cost function as the respective optimized disparity values. The system can further generate a depth image for the first image based on the respective optimized disparity values.

The system can provide the depth image to a rendering engine configured to blur one or more pixels in the first image for replicating a depth of field effect (460). In some implementations, the system can provide the depth image for different external devices for performing different operations. In some implementations, the system can directly provide the respective optimized disparity values for external devices for additional operations. For example, the external devices can include a 3D rendering machine configured to render a 3D scene based on the depth map or disparity map of the scene. As another example, the external device can include a shadow generator configured to generate proper shadow effects for the scene based on the depth map or disparity map. Alternatively, the external device can include a 3D model generator configured to generate a 3D model based on the depth map or disparity map. In particular, the 3D model generator can be configured to generate 3D models for components in a dynamic system (e.g., a robotic system), each component having different poses. The 3D generator can generate 3D models of these components based on the depth map or disparity map generated from 2D images capturing these components. Optionally, the external device can include one or more machine learning models configured to generated respective predictions based on the depth map or disparity map in connection with additional data. For example, one of the machine learning models can predict whether a self-driving vehicle, following a trajectory, will collide with an object in the scene within a particular time period.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, e.g., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it, software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  obtaining data representing a first image of a particular scene generated by a first sensor and a second image of the particular scene generated by a second sensor, wherein the particular scene includes one or more objects, wherein each of the first and second images includes a plurality of pixels;
  determining, for each pixel of the plurality of pixels included in the first image, whether the pixel is a boundary pixel associated with a boundary of an object that is in the particular scene and represented in the first image;
  determining, from a plurality of candidate penalty values and for each pixel included in the first image, an optimized penalty value for the pixel;
  generating an optimized cost function for the first image based on the optimized penalty values for the plurality of pixels; and
  generating a depth image for the first image based on the optimized cost function.

Embodiment 2 is the method of embodiment 1, wherein the method further comprises: providing the depth image to a rendering engine configured to blur one or more pixels in the first image for replicating a depth of field effect.

Embodiment 3 is the method of embodiment 1 or 2, wherein generating the optimized cost function further comprises:
  generating, for each pixel of the plurality of pixels included in the first image, an initial cost function for processing the pixel based on a disparity level of a predetermined set of disparity levels.

Embodiment 4 is the method of embodiment 3, wherein the initial cost function comprises a matching cost function for measuring performance of a block matching process between the pixel in the first image and one or more pixels in the second image, wherein the one or more pixels in the second image are determined based on the pixel in the first image and the disparity level for the initial cost function.

Embodiment 5 is the method of any one of embodiments 1-4, wherein determining whether a pixel in the first image is a boundary pixel comprises:
  generating a prediction for a pixel indicating whether the pixel is a boundary pixel by a trained machine learning model for processing the first image; and
  wherein the trained machine learning model comprises an encoder module and a decoder module, and wherein the prediction for the pixel comprises a likelihood for the pixel being associated with a boundary of an object that is in the particular scene and represented in the first image.

Embodiment 6 is the method of any one of embodiments 1-5, wherein determining the optimized penalty value for the pixel comprises:
  obtaining the plurality of candidate penalty values and arranging the plurality of candidate penalty values in a sequence based on a magnitude of each of the plurality of candidate penalty values;
  generating a plurality of candidate cost functions based on each candidate penalty value of the plurality of candidate penalty values according to the sequence;

generating, from the plurality of candidate cost functions, a respective set of candidate cost volumes for each pixel in the first image;

determining a saliency value for each pixel in the first image; and for each pixel in the first image, selecting, as the optimized penalty value for the pixel, a candidate penalty value from the plurality of candidate penalty values based on the saliency value for the pixel.

Embodiment 7 is the method of embodiment 6, wherein determining the saliency value for the pixel comprises:

generating a waveform for the pixel based on respective candidate cost values from one of the respective set of candidate cost volumes and corresponding disparity levels for generating the respective candidate cost values, wherein the waveform includes one or more minimum values of the respective candidate cost values; and generating the saliency value based on the one or more minimum values in the waveform.

Embodiment 8 is the method of any one of embodiments 1-7, wherein generating the optimized cost function for the plurality of pixels in the first image comprises:

generating, for the plurality of pixels, respective optimized path cost functions for multiple directions in the first image based on the optimized penalty values; and generating the optimized cost function for the first image based at least on the respective optimized path cost functions.

Embodiment 9 is the method of any one of embodiments 1-8, wherein generating the optimized cost function for the plurality of pixels in the first image further comprises:

in response to determining the optimized penalty values for the determined boundary pixels, increasing a common penalty value shared by other pixels in the first image that are not boundary pixels.

Embodiment 10 is a system comprising one or more computers and one or more storage devices storing instructions that are operable, when executed by the one or more computers, to cause the one or more computers to perform the method of any one of embodiments 1 to 9.

Embodiment 11 is a computer storage medium encoded with a computer program, the program comprising instructions that are operable, when executed by data processing apparatus, to cause the data processing apparatus to perform the method of any one of embodiments 1 to 9.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method of generating a depth image, comprising:

obtaining data representing a first image of a particular scene generated by a first sensor and a second image of the particular scene generated by a second sensor, wherein the particular scene includes one or more objects, wherein each of the first and second images includes a plurality of pixels;

determining that a subset of the plurality of pixels in the first image are boundary pixels associated with a boundary of an object that is in the particular scene and represented in the first image;

determining, from a plurality of candidate penalty values and for each boundary pixel of the subset of the plurality of pixels in the first image, an optimized penalty value for the boundary pixel, wherein the optimized penalty value is determined based on saliency information associated with the boundary pixel and is used for penalizing a matching cost of the boundary pixel and a corresponding pixel in the second image;

generating an optimized cost function for the first image based on the optimized penalty values for the subset of the plurality of pixels in the first image; and generating a depth image for the first image based on the optimized cost function.

2. The method of claim 1, further comprising:

providing the depth image to a rendering engine configured to blur one or more pixels in the first image for replicating a depth of field effect.

3. The method of claim 1, wherein generating the optimized cost function further comprises:

generating, for each pixel of the plurality of pixels included in the first image, an initial cost function for processing the pixel based on a disparity level of a predetermined set of disparity levels.

4. The method of claim 3, wherein the initial cost function comprises a matching cost function for measuring performance of a block matching process between a pixel in the first image and one or more pixels in the second image, wherein the one or more pixels in the second image are determined based on the pixel in the first image and the disparity level for the initial cost function.

5. The method of claim 1, wherein determining that a pixel in the first image is a boundary pixel comprises:

generating a prediction for a pixel indicating whether the pixel is a boundary pixel by a trained machine learning model for processing the first image; and wherein the trained machine learning model comprises an encoder module and a decoder module, and wherein the prediction for the pixel comprises a likelihood for the pixel being associated with a boundary of an object that is in the particular scene and represented in the first image.

6. The method of claim 1, wherein determining the optimized penalty value for the boundary pixel comprises:
obtaining the plurality of candidate penalty values and arranging the plurality of candidate penalty values in a sequence based on a magnitude of each of the plurality of candidate penalty values;
generating a plurality of candidate cost functions based on each candidate penalty value of the plurality of candidate penalty values according to the sequence;
generating, from the plurality of candidate cost functions, a respective set of candidate cost volumes for each pixel in the first image;
determining a saliency value for each pixel in the first image; and
for each pixel in the first image, selecting, as the optimized penalty value for the boundary pixel, a candidate penalty value from the plurality of candidate penalty values based on the saliency value for the boundary pixel.

7. The method of claim 6, wherein determining the saliency value for the boundary pixel comprises:
generating a waveform for the boundary pixel based on respective candidate cost values from one of the respective set of candidate cost volumes and corresponding disparity levels for generating the respective candidate cost values, wherein the waveform includes one or more minimum values of the respective candidate cost values; and
generating the saliency value based on the one or more minimum values in the waveform.

8. The method of claim 1, wherein generating the optimized cost function for the plurality of pixels in the first image comprises:
generating, for the plurality of pixels, respective optimized path cost functions for multiple directions in the first image based on the optimized penalty values; and
generating the optimized cost function for the first image based at least on the respective optimized path cost functions.

9. The method of claim 1, wherein generating the optimized cost function for the plurality of pixels in the first image further comprises:
in response to determining the optimized penalty values for the determined boundary pixels, increasing a common penalty value shared by other pixels in the first image that are not boundary pixels.

10. A system comprising one or more computers and one or more storage devices storing instructions that when executed by one or more computers cause the one or more computers to perform respective operations, the operations comprising:
obtaining data representing a first image of a particular scene generated by a first sensor and a second image of the particular scene generated by a second sensor, wherein the particular scene includes one or more objects, wherein each of the first and second images includes a plurality of pixels;
determining that a subset of the plurality of pixels in the first image are boundary pixels associated with a boundary of an object that is in the particular scene and represented in the first image;
determining, from a plurality of candidate penalty values and for each boundary pixel of the subset of the plurality of pixels in the first image, an optimized penalty value for the boundary pixel, wherein the optimized penalty value is determined based on saliency information associated with the boundary pixel and is used for penalizing a matching cost of the boundary pixel and a corresponding pixel in the second image;
generating an optimized cost function for the first image based on the optimized penalty values for the subset of the plurality of pixels in the first image; and
generating a depth image for the first image based on the optimized cost function.

11. The system of claim 10, wherein the operations further comprise:
providing the depth image to a rendering engine configured to blur one or more pixels in the first image for replicating a depth of field effect.

12. The system of claim 10, wherein determining that a pixel in the first image is a boundary pixel comprises:
generating a prediction for a pixel indicating whether a pixel is a boundary pixel by a trained machine learning model for processing the first image; and
wherein the trained machine learning model comprises an encoder module and a decoder module, and wherein the prediction for the pixel comprises a likelihood for the pixel being associated with a boundary of an object that is in the particular scene and represented in the first image.

13. The system of claim 10, wherein determining the optimized penalty value for the boundary pixel comprises:
obtaining the plurality of candidate penalty values and arranging the plurality of candidate penalty values in a sequence based on a magnitude of each of the plurality of candidate penalty values;
generating a plurality of candidate cost functions based on each candidate penalty value of the plurality of candidate penalty values according to the sequence;
generating, from the plurality of candidate cost functions, a respective set of candidate cost volumes for each pixel in the first image;
determining a saliency value for each pixel in the first image; and
for each pixel in the first image, selecting, as the optimized penalty value for the boundary pixel, a candidate penalty value from the plurality of candidate penalty values based on the saliency value for the boundary pixel.

14. The system of claim 10, wherein determining the saliency value for the boundary pixel comprises:
generating a waveform for the boundary pixel based on respective candidate cost values from one of the respective set of candidate cost volumes and corresponding disparity levels for generating the respective candidate cost values, wherein the waveform includes one or more minimum values of the respective candidate cost values; and
generating the saliency value based on the one or more minimum values in the waveform.

15. One or more computer-readable storage media storing instructions that when executed by one or more computers cause the one or more computers to perform respective operations, the respective operations comprising:
obtaining data representing a first image of a particular scene generated by a first sensor and a second image of the particular scene generated by a second sensor, wherein the particular scene includes one or more objects, wherein each of the first and second images includes a plurality of pixels;

determining that a subset of the plurality of pixels in the first image are boundary pixels associated with a boundary of an object that is in the particular scene and represented in the first image;

determining, from a plurality of candidate penalty values and for each boundary pixel of the subset of the plurality of pixels in the first image, an optimized penalty value for the boundary pixel, wherein the optimized penalty value is determined based on saliency information associated with the boundary pixel and is used for penalizing a matching cost of the boundary pixel and a corresponding pixel in the second image;

generating an optimized cost function for the first image based on the optimized penalty values for the subset of the plurality of pixels in the first image; and generating a depth image for the first image based on the optimized cost function.

16. The one or more computer-readable storage media of claim 15, wherein the operations further comprise:

providing the depth image to a rendering engine configured to blur one or more pixels in the first image for replicating a depth of field effect.

17. The one or more computer-readable storage media of claim 15, wherein determining that a pixel in the first image is a boundary pixel comprises:

generating a prediction for a pixel indicating whether a pixel is a boundary pixel by a trained machine learning model for processing the first image; and wherein the trained machine learning model comprises an encoder module and a decoder module, and wherein the prediction for the pixel comprises a likelihood for the pixel being associated with a boundary of an object that is in the particular scene and represented in the first image.

18. The one or more computer-readable storage media of claim 15, wherein determining the optimized penalty value for the boundary pixel comprises:

obtaining the plurality of candidate penalty values and arranging the plurality of candidate penalty values in a sequence based on a magnitude of each of the plurality of candidate penalty values;

generating a plurality of candidate cost functions based on each candidate penalty value of the plurality of candidate penalty values according to the sequence;

generating, from the plurality of candidate cost functions, a respective set of candidate cost volumes for each pixel in the first image;

determining a saliency value for each pixel in the first image; and for each pixel in the first image, selecting, as the optimized penalty value for the boundary pixel, a candidate penalty value from the plurality of candidate penalty values based on the saliency value for the boundary pixel.

19. The one or more computer-readable storage media of claim 15, wherein determining the saliency value for the boundary pixel comprises:

generating a waveform for the boundary pixel based on respective candidate cost values from one of the respective set of candidate cost volumes and corresponding disparity levels for generating the respective candidate cost values, wherein the waveform includes one or more minimum values of the respective candidate cost values; and generating the saliency value based on the one or more minimum values in the waveform.

20. The one or more computer-readable storage media of claim 15, wherein generating the optimized cost function for the plurality of pixels in the first image further comprises:

in response to determining the optimized penalty values for the determined boundary pixels, increasing a common penalty value shared by other pixels in the first image that are not boundary pixels.

* * * * *